(12) United States Patent
Malec et al.

(10) Patent No.: US 8,353,422 B2
(45) Date of Patent: Jan. 15, 2013

(54) FUEL DELIVERY MODULE

(75) Inventors: Radek Malec, Ceske Budejovice (CZ);
Vladimir Ptacek, Modrany (CZ);
Martin Ptacek, Ceske Budejovice (CZ);
Martin Sykora, Ceske Budejovice (CZ);
Josef Jarosik, Ceske Budejovice (CZ);
Miloslav Gabris, Ceske Budejovice (CZ)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 12/678,214

(22) PCT Filed: Aug. 11, 2008

(86) PCT No.: PCT/EP2008/060528
§ 371 (c)(1),
(2), (4) Date: Mar. 15, 2010

(87) PCT Pub. No.: WO2009/040181
PCT Pub. Date: Apr. 2, 2009

(65) Prior Publication Data
US 2010/0200595 A1 Aug. 12, 2010

(30) Foreign Application Priority Data
Sep. 21, 2007 (DE) .......................... 10 2007 045 178

(51) Int. Cl.
*B65D 88/00* (2006.01)
(52) U.S. Cl. .................................................. 220/567.2
(58) Field of Classification Search ............... 220/567.2, 220/567.1, 565, 920; 123/509, 497, 495
See application file for complete search history.

(56) References Cited

U.S. PATENT DOCUMENTS

| | | | | |
|---|---|---|---|---|
| 4,190,159 A * | 2/1980 | Hoyt | ............................... | 206/524 |
| 4,430,977 A * | 2/1984 | Shimada | ....................... | 123/449 |
| 4,807,582 A * | 2/1989 | Tuckey | ........................... | 123/514 |
| 4,945,884 A * | 8/1990 | Coha et al. | ..................... | 123/509 |
| 5,092,024 A * | 3/1992 | McGarvey | ...................... | 29/460 |
| 5,363,827 A * | 11/1994 | Siekmann | ...................... | 123/509 |
| 5,394,850 A * | 3/1995 | Murphy et al. | ............... | 123/470 |
| 5,495,695 A * | 3/1996 | Elliott, Jr. | ......................... | 52/20 |

(Continued)

FOREIGN PATENT DOCUMENTS

EP 0921299 A2 6/1999
(Continued)

*Primary Examiner* — Steven A. Reynolds
*Assistant Examiner* — King M Chu
(74) *Attorney, Agent, or Firm* — Michael Best & Friedrich LLP

(57) ABSTRACT

Fuel delivery modules are already known having a tank flange and having an accumulator pot which is connected to the tank flange by means of at least one guide rod and which is mounted so as to be axially movable along the guide rod, where the guide rod is pressed with one end into a receptacle of the tank flange. It is disadvantageous that the receptacle is expanded over the entire longitudinal extent as the guide rod is pressed in. As a result of tolerance fluctuations in production, excessively high pressures can occur in the receptacle here, which pressures can cause cracks in the receptacle. This leads to rejects and therefore to high production costs. In the fuel delivery module according to the invention, damage to the receptacle during assembly is prevented. According to the invention, it is provided that that end of the guide rod which faces toward the tank flange has a bead, which interacts in a retentive manner with the receptacle, and a constriction situated behind the bead in a direction facing away from the tank flange.

20 Claims, 2 Drawing Sheets

U.S. PATENT DOCUMENTS

| | | | |
|---|---|---|---|
| 5,762,049 A * | 6/1998 | Jones et al. | 123/514 |
| 6,149,399 A * | 11/2000 | Bowser et al. | 417/279 |
| 6,152,174 A * | 11/2000 | Hein | 137/576 |
| 6,260,543 B1 * | 7/2001 | Chih | 123/509 |
| 6,718,949 B2 * | 4/2004 | Gmelin | 123/470 |
| 6,802,301 B2 * | 10/2004 | Fauser et al. | 123/509 |
| 7,168,416 B2 * | 1/2007 | Powell et al. | 123/509 |
| 7,527,042 B2 * | 5/2009 | Crary | 123/509 |
| 7,800,883 B2 * | 9/2010 | Nederegger | 361/215 |
| 2004/0000344 A1 * | 1/2004 | Okabe et al. | 137/565.22 |
| 2004/0173188 A1 * | 9/2004 | Braun | 123/509 |
| 2006/0073029 A1 * | 4/2006 | Torii | 417/360 |

FOREIGN PATENT DOCUMENTS

EP          0965748 A1    12/1999

* cited by examiner

FUEL DELIVERY MODULE

CROSS-REFERENCE TO RELATED APPLICATION

This application is a 35 USC 371 application of PCT/EP2008/060528filed on Aug. 11, 2008.

BACKGROUND OF THE INVENTION

1. Field of the Invention

The invention is based on a fuel delivery module.

2. Description of the Prior Art

A fuel delivery module is already known from German Patent Disclosure DE 103 35 045 A1 and Japanese Patent Disclosure JP-2001280209 A, having a tank flange and a reservoir pot which is connected to the tank flange via at least one guide rod and is supported axially movably along the guide rod, and the guide rod is press-fitted by one end into a receptacle of the tank flange. It is disadvantageous that the receptacle is widened over the entire length as the guide rod as press-fitted in. Fluctuations in tolerances in manufacture can lead to excessive pressures in the receptacle, which can cause cracks, in the receptacle. This leads to rejects and thus to high production costs.

ADVANTAGES AND SUMMARY OF THE INVENTION

The fuel delivery module according to the invention has the advantage over the prior art that damage to the receptacle in assembly is avoided, because the end of the guide rod oriented toward the tank flange has a bead, cooperating retentively with the receptacle, and a constriction located behind the bead. By the embodiment according to the invention, the pressing of the guide rod is effected only in the region of the bead.

In an advantageous feature, the bead is embodied as disklike, pinheadlike, shoulderlike, annular, flangelike, toroidal or collarlike in shape.

It is especially advantageous if the receptacle of the tank flange, viewed in the pressing-in direction, has a guide portion and adjoining it a retention portion which is narrowed compared to the guide portion, and between the bead and the guide portion, a clearance fit is provided, and between the bead and the retention portion, a press fit is provided. This has the advantage that the pressing length is shorter, and thus the risk of crack development is reduced.

It is also advantageous if the retention portion of the tank flange has longitudinal ribs, and each bead is pressed against the respective longitudinal rib. This has the advantage that the requisite press-fitting force is reduced, and thus the assembly equipment becomes less expensive.

It is highly advantageous if the two ends of the guide rod are embodied as essentially mirror-symmetrical or identical, since in this way, each end of the guide rod can be press-fitted into the receptacle. The guide rods therefore need not be delivered to the assembly machines in oriented fashion in the production process.

BRIEF DESCRIPTION OF THE DRAWINGS

One exemplary embodiment of the invention is shown in simplified form in the drawings and described in further detail below in conjunction with the drawings, in which.

DESCRIPTION OF THE PREFERRED EMBODIMENT

Figure 1:
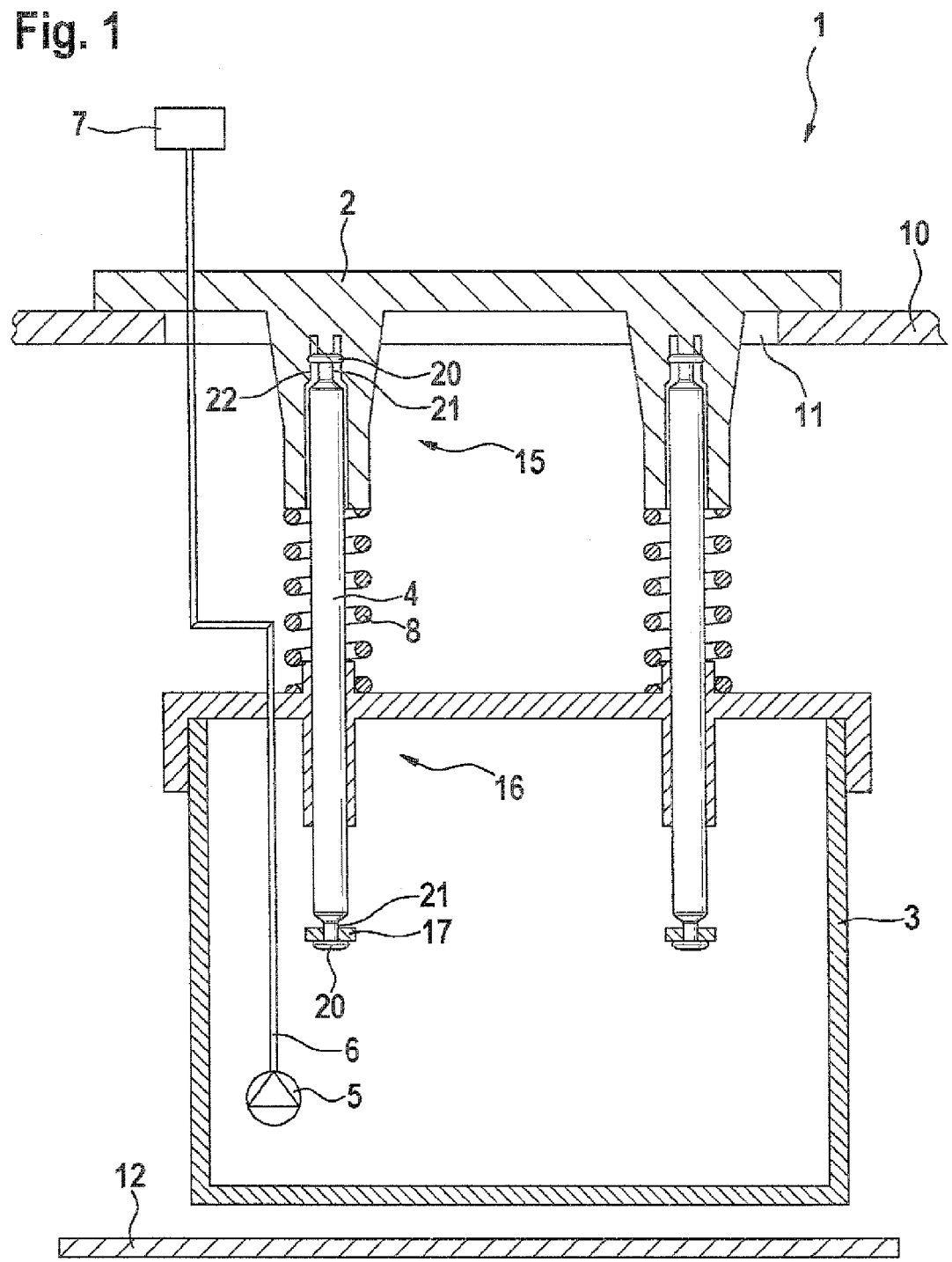
FIG. 1, in section, shows a fuel delivery module in simplified form.

FIG. 1, in section, shows a fuel delivery module 1 in simplified form.

The fuel delivery module 1 has a tank flange 2 and a reservoir pot 3 which is connected to the tank flange 2 via one and for instance two guide rods 4 and is supported axially movably in the direction of the guide rods 4 relative to the tank flange 2. A delivery unit 5 may be provided in the reservoir pot 3; it aspirates fuel from the reservoir pot 3 and delivers it, at elevated pressure, via a pressure line 6 to an internal combustion engine 7. The fuel delivery module 1 is provided in a fuel tank 10, which has an assembly opening 11 through which the fuel delivery module 1 can be inserted into the fuel tank 10. The tank flange 2 is disposed in the assembly opening 11 and closes it. The fuel delivery module 1 has at least one spring element 8, which presses the reservoir pot 3 in the direction away from the tank flange 2. In this way, the reservoir pot 3 is pressed against a base 12 of the fuel tank 10. The spring element is a helical spring, for example, which is disposed on the guide rod 4 and braced on the tank flange 2 and which acts with its other end on the reservoir pot 3.

The guide rod 4, which is for instance cylindrical, is press-fitted by one end into a receptacle 15 of the tank flange 2 and extends from the receptacle 15 in the direction of the reservoir pot 3. The receptacle 15 is an indentation, for instance a blind bore, on the tank flange 2. The guide rod 4 is provided on the reservoir pot 3 in a guide 16 that permits an axial motion of the reservoir pot 3 in the direction of the guide rod 4. A stop 17, such as a securing ring or securing disk, for limiting the axial motion is for instance embodied on the guide rod 4.

The guide rod 4 is made from metal or plastic.

Figure 2:
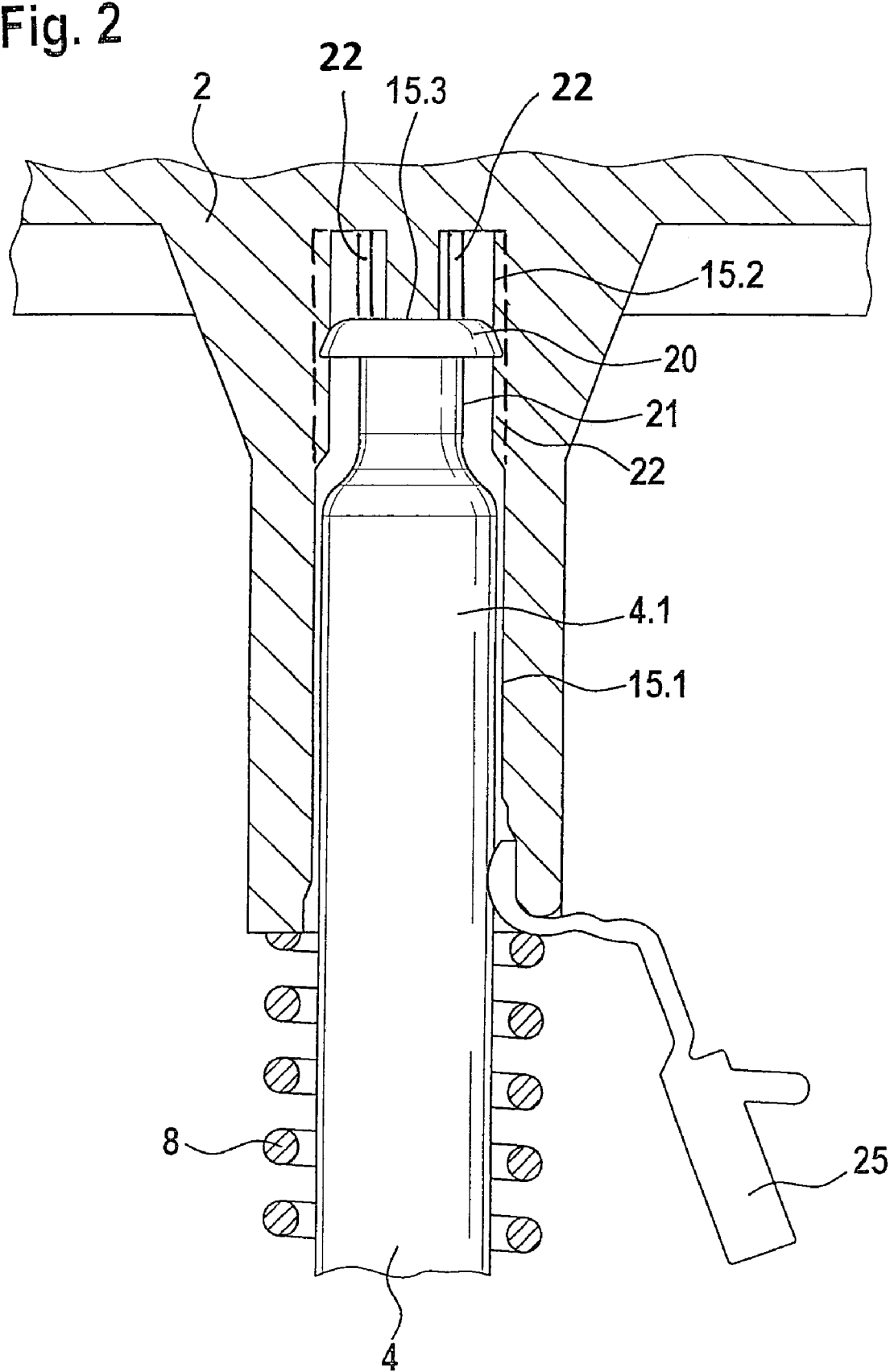
FIG. 2 shows a fragmentary view of the fuel delivery module of FIG. 1.

FIG. 2 shows a view of the press-fit connection between the tank flange 2 and the guide rod 4 of FIG. 1.

In the apparatus of FIG. 2, those elements that remain the same or function the same as in the apparatus of FIG. 1 are identified by the same reference numerals.

According to the invention, it is provided that the end oriented toward the tank flange 2 of each guide rod 4 has a bead 20, cooperating retentively with the receptacle 15 (FIG. 1), and a constriction 21 located behind it and adjacent to the bead 20. In this way, the pressing is embodied only in the region of the bead 20, so that there is a lesser load on the receptacle 15 than in the prior art. The bead 20 is an annular thickening of the guide rod 4, disposed for instance on the end of the guide rod 4 oriented toward the tank flange 2. In the exemplary embodiment, the bead 20 is embodied as disklike, pinheadlike, shoulderlike, annular, flangelike, toroidal or collarlike in shape. For instance, the edges of the bead 20 oriented toward the receptacle 15 are embodied as rounded.

The guide rod 4 has a main portion 4.1. The diameter of each bead 20 is less than or equal to the diameter of the main portion 4.1. The constriction 21 has a diameter that is less than the diameter of the main portion 4.1 and the diameter of the bead 20. The transition from the main portion 4.1 to the constriction 21 can be designed as steplike or continuous, for instance conical.

The receptacle 15 of the tank flange 2, viewed in the press-in direction, has a guide portion 15.1 and adjoining it a retention portion 15.2, which is narrowed compared to the guide portion 15.1. Between the bead 20 and the guide portion 15.1 of the receptacle. 15, a clearance fit is provided, and between the bead 20 and the retention portion 15.2 of the receptacle 15, a press fit is provided. With respect to the longitudinal direction, the retention portion 15.2 is embodied as shorter than the guide portion 15.1. As a result of this embodiment, the bead 20 can be easily introduced into the receptacle 15 and is not press-fitted in until in the vicinity of the short retention portion 15.2, over a short distance. The guide rod 4 is inserted into the receptacle 15 as far as a base or a stop 15.3.

The constriction 21 is embodied in the axial direction as long enough that, after the assembly of the guide rod 4 in the receptacle 15, it extends from the bead 20 into the vicinity of the guide portion 15.1 of the receptacle 15. In this way, it is ensured that only the bead 20, and not the main portion 4.1, is press-fitted into the retention portion 15.2.

In the exemplary embodiment, the narrowing of the retention portion 15.2 is attained by means of longitudinal ribs 22, spaced apart from one another and distributed over the circumference of the receptacle 15. It is understood that instead of the longitudinal ribs 22, a shoulder may be provided, which over the entire circumference has a constant diameter that is less than that of the guide portion 15.1. Upon insertion of the guide rod 4 into the receptacle 15, the bead 20 is pressed against the retention portion 15.2, for instance against the longitudinal ribs 22. As a result of the pressing, the bead 20 presses elastically into the material of the receptacle 15.

The two ends of the guide rod 4 are embodied as essentially mirror-symmetrical or identical. The guide rod 4 therefore has a single bead 20 on each of its ends and thus a constriction 21 located behind each bead. The mirror-symmetrical embodiment of the guide rod 4 facilitates the manufacture of the fuel delivery module, since both ends are suitable for being press-fitted into the receptacle 15. The guide rods 4 therefore need not be delivered to the assembly machines in oriented fashion in the production process.

A grounding plug 25 provided on the receptacle 15 electrically contacts the guide rod 4 and is connected to an electrical ground, to allow electrical charges to flow away from the guide rod 4. The grounding plug 25 extends with one prong into an interstice between the guide rod 4 and the guide portion 15.1 of the receptacle 15.

The foregoing relates to the preferred exemplary embodiment of the invention, it being understood that other variants and embodiments thereof are possible within the spirit and scope of the invention, the latter being defined by the appended claims.

What is claimed is:

1. A fuel delivery module, comprising:
a tank flange;
at least one guide rod having two ends; and
a reservoir pot which is connected to the tank flange via the at least one guide rod and which is supported axially movably along the guide rod,
the guide rod being press-fitted by one end thereof into a receptacle of the tank flange in a pressing-in direction, the one end of the guide rod oriented toward the tank flange having a bead which retentively cooperates with the receptacle, and the one end having a constriction located behind the bead in a direction oriented away from the tank flange, wherein the guide rod is embodied with a bead and a constriction disposed at each of the two ends thereof and with a main portion disposed between each constriction, and wherein each constriction has a diameter less than those of the main portion and of each bead.

2. The fuel delivery module as defined by claim 1, wherein the bead is embodied as a disk, as a pinhead, as toroidal, as a shoulder, as annular, as a flange, or as a collar.

3. The fuel delivery module as defined by claim 1, wherein the bead has rounded edges on its circumference in an axial direction.

4. The fuel delivery module as defined by claim 1, wherein a diameter of each bead is less than or equal to a diameter of the main portion.

5. The fuel delivery module as defined by claim 2, wherein a diameter of each bead is less than or equal to a diameter of the main portion.

6. The fuel delivery module as defined by claim 3, wherein a diameter of each bead is less than or equal to a diameter of the main portion.

7. The fuel delivery module as defined by claim 1, wherein the receptacle of the tank flange, viewed in the pressing-in direction, has a guide portion and adjoining it a retention portion which is narrowed compared to the guide portion.

8. The fuel delivery module as defined by claim 2, wherein the receptacle of the tank flange, viewed in the pressing-in direction, has a guide portion and adjoining it a retention portion which is narrowed compared to the guide portion.

9. The fuel delivery module as defined by claim 4, wherein the receptacle of the tank flange, viewed in the pressing-in direction, has a guide portion and adjoining it a retention portion which is narrowed compared to the guide portion.

10. The fuel delivery module as defined by claim 7, wherein between the bead and the guide portion, a clearance fit is provided, and between the bead and the retention portion, a press fit is provided.

11. The fuel delivery module as defined by claim 9, wherein between the bead and the guide portion, a clearance fit is provided, and between the bead and the retention portion, a press fit is provided.

12. The fuel delivery module as defined by claim 7, wherein the retention portion of the tank flange has longitudinal ribs, and the bead is pressed against the longitudinal ribs.

13. The fuel delivery module as defined by claim 9, wherein the retention portion of the tank flange has longitudinal ribs, and the bead is pressed against the longitudinal ribs.

14. The fuel delivery module as defined by claim 10, wherein the retention portion of the tank flange has longitudinal ribs, and the bead is pressed against the longitudinal ribs.

15. The fuel delivery module as defined by claim 11, wherein the retention portion of the tank flange has longitudinal ribs, and the bead is pressed against the longitudinal ribs.

16. The fuel delivery module as defined by claim 1, wherein the two ends of the guide rod are embodied as essentially mirror-symmetrical or identical.

17. The fuel delivery module as defined by claim 4, wherein the two ends of the guide rod are embodied as essentially mirror-symmetrical or identical.

18. The fuel delivery module as defined by claim 1, wherein the guide rod penetrates a guide of the reservoir pot, and on the constriction of oriented toward the reservoir pot, a stop is provided.

19. The fuel delivery module as defined by claim 4, wherein the guide rod penetrates a guide of the reservoir pot, and on the constriction of the one end of the guide rod oriented toward the reservoir pot, a stop is provided.

20. A fuel delivery module, comprising:
a tank flange;
at least one guide rod having two ends; and a reservoir pot which is connected to the tank flange via the at least one guide rod and which is supported axially movably along the guide rod, the guide rod being press-fitted by one end thereof into a receptacle of the tank flange in a pressing-in direction, the one end of the guide rod oriented toward the tank flange having a bead which retentively cooperates with the receptacle, and the one end having a constriction located behind the bead in a direction oriented away from the tank flange, wherein the receptacle of the tank flange, viewed in the pressing-in direction, has a guide portion and adjoining it a retention portion which is narrowed compared to the guide portion, and wherein between the bead and the guide portion, a clearance fit is provided, and between the bead and the retention portion, a press fit is provided.

* * * * *